(12) United States Patent
Liu et al.

(10) Patent No.: US 11,940,610 B2
(45) Date of Patent: Mar. 26, 2024

(54) AUTOFOCUS SYSTEM AND AUTOFOCUS METHOD

(71) Applicant: National Cheng-Kung University, Tainan (TW)

(72) Inventors: Chien-Sheng Liu, Tainan (TW); Ho-Da Tu, Kaohsiung (TW)

(73) Assignee: National Cheng-Kung University, Tainan (TW)

( * ) Notice: Subject to any disclaimer, the term of this patent is extended or adjusted under 35 U.S.C. 154(b) by 240 days.

(21) Appl. No.: 17/562,006

(22) Filed: Dec. 27, 2021

(65) Prior Publication Data

US 2023/0185072 A1 Jun. 15, 2023

(30) Foreign Application Priority Data

Dec. 13, 2021 (TW) .................................. 110146579

(51) Int. Cl.
*G02B 21/00* (2006.01)
*G02B 21/02* (2006.01)
*G02B 21/36* (2006.01)
*H04N 23/67* (2023.01)

(52) U.S. Cl.
CPC ........... *G02B 21/361* (2013.01); *G02B 21/02* (2013.01); *H04N 23/67* (2023.01)

(58) Field of Classification Search
CPC .............................. H04N 23/00; G03B 21/00
See application file for complete search history.

(56) References Cited

U.S. PATENT DOCUMENTS

| | | | |
|---|---|---|---|
| 7,071,451 B2 | 7/2006 | Ishikawa et al. | |
| 2017/0023409 A1* | 1/2017 | Sonehara | ........... G01N 21/6458 |
| 2017/0199367 A1 | 7/2017 | Muller | |

FOREIGN PATENT DOCUMENTS

| | | |
|---|---|---|
| CN | 105637382 | 8/2017 |
| CN | 108646396 | 10/2018 |
| CN | 112415735 | 2/2021 |
| TW | 201638621 | 11/2016 |

(Continued)

OTHER PUBLICATIONS

Chien-Sheng Liu et al., "Design of a laser-based autofocusing microscope for a sample with a transparent boundary layer", Applied Physics B, Nov. 2019, pp. 1-14.

(Continued)

*Primary Examiner* — Maryam A Nasri
(74) *Attorney, Agent, or Firm* — JCIPRNET

(57) ABSTRACT

An autofocus system includes a focus light source, an objective lens, a defocus lens, a first image sensor, and a controller. The defocus lens is disposed on the transmission path of the focus light beam, so that a minimum light point of the focus light beam passing through the objective lens deviates from a focus of the objective lens. The first image sensor is configured to receive a focus reflected light beam generated after the focus light beam is reflected by the sample. The controller is electrically connected to the first image sensor. According to a center change of gravity, a position change, or an energy change of a light spot formed by the focus reflected light beam on an image plane of the first image sensor, the controller drives the objective lens or the sample to move, so that the focus of the objective lens falls on the sample.

8 Claims, 3 Drawing Sheets

(56) References Cited

FOREIGN PATENT DOCUMENTS

TW 201809778 3/2018

OTHER PUBLICATIONS

Chien-Sheng Liu et al., "Design and characterization of precise laser-based autofocusing microscope with reduced geometrical fluctuations", Microsyst Technol, Jul. 25, 2013, pp. 1717-1724.

Chien-Sheng Liu et al., "Design and experimental validation of novel optics-based autofocusing microscope", Appl. Phys. B, Sep. 15, 2012, pp. 259-268.

Chien-Sheng Liu et al., "A novel laser displacement sensor with improved robustness toward geometrical fluctuations of the laser beam", Measurement Science and Technology, Aug. 14, 2013, pp. 1-9.

Chien-Sheng Liu et al., "Design and experimental validation of novel enhanced-performance autofocusing microscope", Applied Physics B, Oct. 7, 2014, pp. 1161-1171.

Chien-Sheng Liu et al., "Design and characterization of high-performance autofocusing microscope with zoom in/out functions", Applied Physics B, Aug. 26, 2015, pp. 69-80.

Chien-Sheng Liu et al., "Precise autofocusing microscope with rapid response", Optics and Lasersin Engineering, Mar. 2015, pp. 294-300.

Chien-Sheng Liu et al., "Novel system for simultaneously measuring the thickness and refractive index of a transparent plate with two optical paths", Applied Physics B, Aug. 23, 2018, pp. 1-12.

Yu-Ta Chen et al., "An Optical Sensor for Measuring the Position and Slanting Direction of Flat Surfaces", Sensors, Jul. 9, 2016, pp. 1-13.

Chia-Ming Jan et al., "Implementation and Optimization of a Dual-confocal Autofocusing System", Sensors, Jun. 19, 2020, pp. 1-12.

"Office Action of Taiwan Counterpart Application", dated Jul. 12, 2022, p. 1-p. 3.

\* cited by examiner

AUTOFOCUS SYSTEM AND AUTOFOCUS METHOD

CROSS-REFERENCE TO RELATED APPLICATION

This application claims the priority benefit of Taiwan application serial no. 110146579, filed on Dec. 13, 2021. The entirety of the above-mentioned patent application is hereby incorporated by reference herein and made a part of this specification.

BACKGROUND

Technical Field

The disclosure relates to an autofocus system and an autofocus method.

Description of Related Art

In general, autofocus systems may be divided into two types: an image type and an optical type. The image type autofocus system is well known to the industry. The major advantage of the image type autofocus system lies in low costs, whereas the disadvantage rests in the excessively long response time and the limitation to accuracy due to the focal depth. Therefore, in recent years, the image type autofocus system has been gradually replaced by an optical type autofocus module, which determines a defocus distance and a direction based on variations in light patterns (or light energy) detected by a light sensor. The major advantage lies in high accuracy and short response time. However, when a to-be-sensed object is already located around the focal point, the light pattern detected by the light detector may be severely deformed, which may lead to erroneous determination of the defocus distance and the direction, thus increasing difficulties in determination by the autofocus system.

SUMMARY

The disclosure provides an autofocus system and an autofocus method with high focus accuracy and reduced response time.

An embodiment of the disclosure provides an autofocus system which includes a focus light source, an objective lens, a defocus lens, a first image sensor, and a controller. The focus light source is configured to emit a focus light beam. The objective lens is disposed on a transmission path of the focus light beam, where the focus light beam irradiates a sample after passing through the objective lens. The defocus lens is disposed on the transmission path of the focus light beam, so that a minimum light point of the focus light beam passing through the objective lens deviates from a focus of the objective lens. The first image sensor is configured to receive a focus reflected light beam generated after the focus light beam is reflected by the sample. The controller is electrically connected to the first image sensor. According to a center change of gravity, a position change, or an energy change of a light spot formed by the focus reflected light beam on an image plane of the first image sensor, the controller drives the objective lens or the sample to move, so that the focus of the objective lens falls on the sample.

An embodiment of the disclosure provides an autofocus method which includes following steps. A focus light source is controlled to emit a focus light beam, so that a minimum light point of the focus light beam passing through an objective lens deviates from a focus of the objective lens, wherein the focus light beam sequentially passes through a defocus lens and the objective lens and then irradiates a sample. A focus reflected light beam generated after the focus light beam is reflected by the sample is received. According to a center change of gravity, a position change, or an energy change of a light spot formed by the focus reflected light beam on an image plane of a first image sensor, the objective lens or the sample is driven to move, so that the focus of the objective lens falls on the sample.

In view of the above, in the autofocus system and the autofocus method provided in one or more embodiments of the disclosure, the defocus lens disposed on the transmission path of the focal light beam is applied, so that the minimum light spot of the focus light beam passing through the objective lens deviates from the focus of the objective lens. Thereby, erroneous determination of the distance between the focus of the objective lens and the sample may be prevented to a better extent by applying the autofocus system and the autofocus method provided in one or more embodiments of the disclosure, system accuracy may be further improved, and response time may be further reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
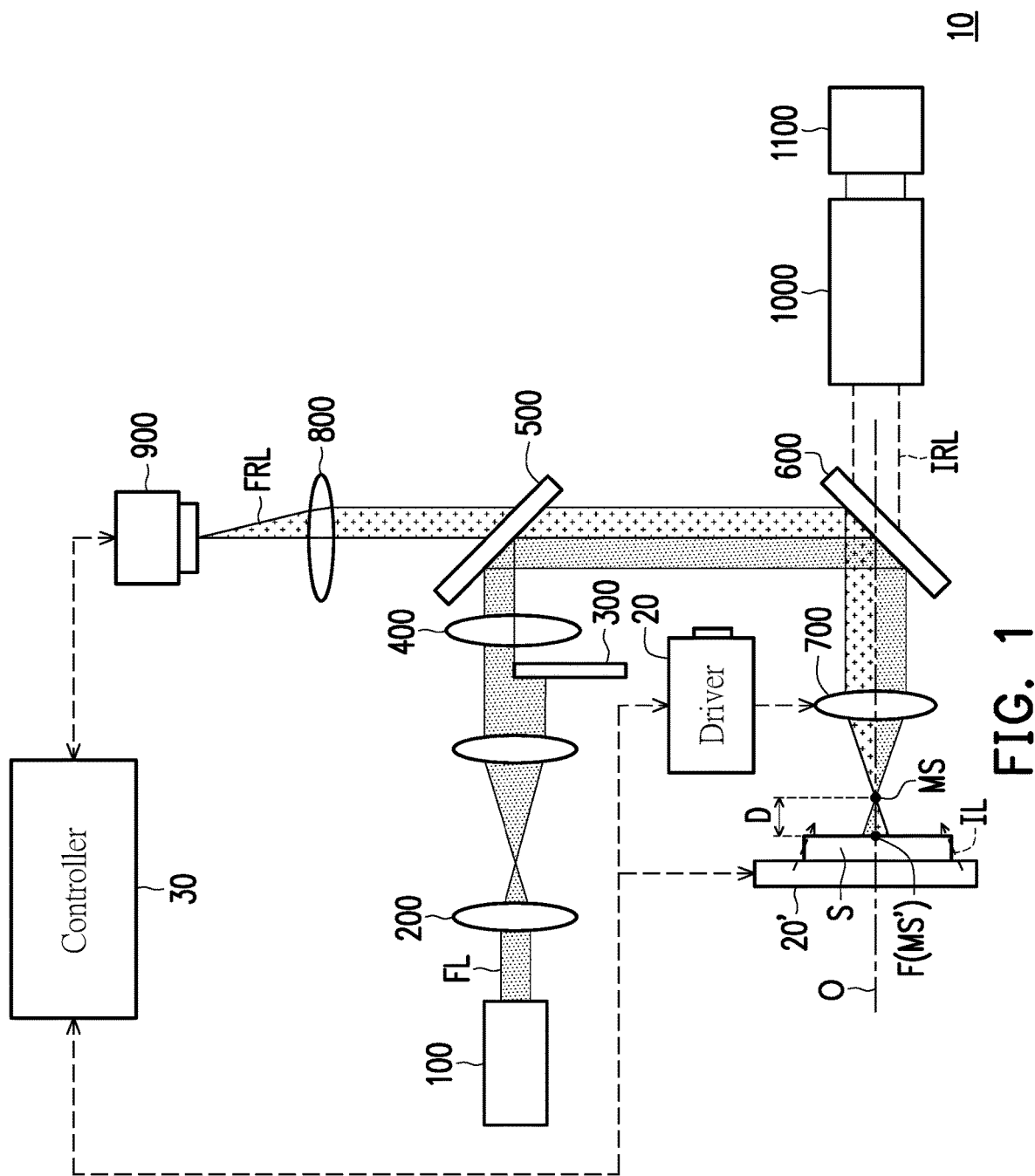
FIG. 1 is a schematic view of an autofocus system according to an embodiment of the disclosure.

FIG. 1 is a schematic view of an autofocus system according to an embodiment of the disclosure. With reference to FIG. 1, an autofocus system 10 provided in one embodiment of the disclosure includes a focus light source 100, an objective lens 700, a defocus lens 400, a first image sensor 900, and a controller 30. The focus light source 100 is configured to emit a focus light beam FL. Here, the focus light source 100 is, for instance, a laser diode (LD) light source, a light-emitting diode (LED) light source, or any other appropriate light source. The focus light beam FL is, for instance, an infrared light beam or a light beam of another wavelength.

In the present embodiment, the objective lens 700 is disposed on a transmission path of the focus light beam FL, where the focus light beam FL irradiates a sample S after passing through the objective lens 700. The defocus lens 400 is disposed on the transmission path of the focus light beam FL, and the defocus lens 400 is disposed between the objective lens 700 and the focus light source 110 on the transmission path of the focus light beam FL. The defocus lens 400 allows a minimum light point MS of the focus light beam FL passing through the objective lens 700 deviates from a focus F of the objective lens 700. Here, the focus F is the minimum light point of a parallel light beam just passing through the objective lens 700, i.e., the focal length of the objective lens 700. To facilitate the illustration, FIG. 1 schematically shows that the focus F of the objective lens 700 falls on the sample S.

In the present embodiment, the first image sensor 900 may be a thin film transistor (TFT), a complementary metal oxide semiconductor (CMOS), a charge coupled device (CCD), or an any other optical sensor, which should however not be construed as a limitation in the disclosure.

The controller 30 includes, for instance, a microcontroller unit (MCU), a central processing unit (CPU), a microprocessor, a digital signal processor (DSP), a programmable controller, a programmable logic device (PLD), any other similar device, or a combination of these device, which should however not be construed as a limitation in the disclosure. Besides, in an embodiment of the disclosure, various functions of the controller 30 may be implemented in form of programming codes, which may be stored in a memory and may be executed by the controller 30. Alternatively, in an embodiment of the disclosure, the functions of the controller 30 may be implemented in form of one or more circuits. Whether the functions of the controller 30 are implemented in form of software or hardware is not limited in the disclosure.

In this embodiment, the first image sensor 900 is configured to receive a focus reflected light beam FRL generated after the focus light beam FL is reflected by the sample S. The controller 30 is electrically connected to the first image sensor 900. According to a center change of gravity, a position change, or an energy change of a light spot formed by the focus reflected light beam FRL on an image plane of the first image sensor 900 (e.g., a light spot RS1 or RS2 on an image plane IP shown in FIG. 2), the controller 30 drives the objective lens 700 or the sample S to move along an optical axis O of the objective lens 700, so that the focus F of the objective lens 700 falls on the sample S.

Figure 2:
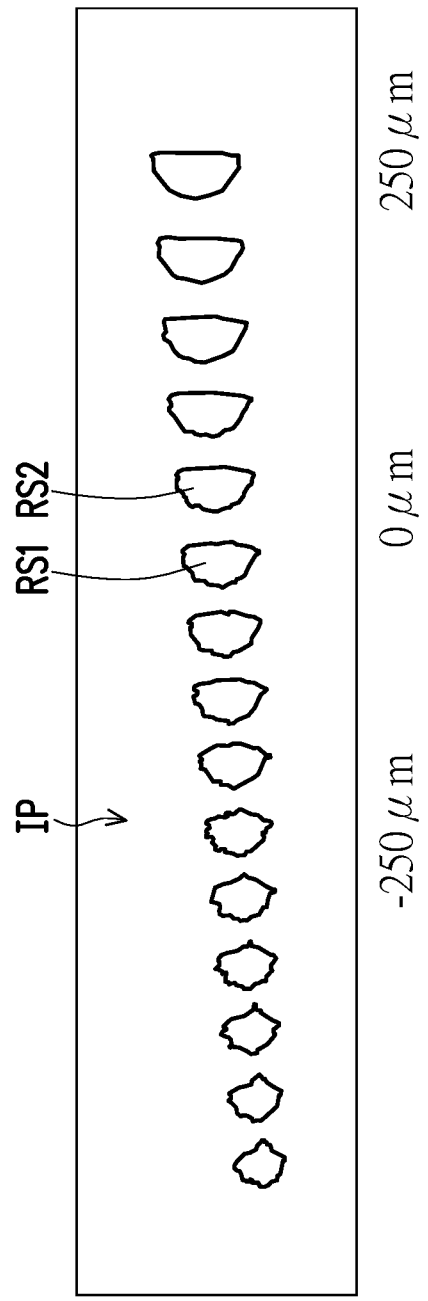
FIG. 2 is a schematic view illustrating different light spots formed on an image plane of a first image sensor.

FIG. 2 is a schematic view illustrating different light spots formed on an image plane of a first image sensor. With reference to FIG. 1 and FIG. 2, if the autofocus system is not equipped with the defocus lens 400, the light spots shown in FIG. 2 from left to right may be the light speckle close to the sample S (i.e., when the minimum light point MS of the focus light beam FS passing through the objective lens 700 is located closest to the sample S) to the light spot far away from the sample S, and the light spots are formed on the image plane IP of the first image sensor 900. If the autofocus system 10 is equipped with the defocus lens 400, the defocus lens 400, the defocus lens 400 enables displacement of each of the light spots on the image plane IP; for instance, FIG. 2 shows a displacement of 500 μm (at this time, the minimum light point MS is displaced, but the focus F is not displaced). Here, the light spots RS1 and RS2 are the light spots when the focus F of the objective lens 700 is closest to the sample S. Since the light spots from −250 μm to 250 μm in FIG. 2 have a substantially semicircular shape, the autofocus system 10 may easily analyze the center change of gravity, the position change, or the energy change of each light spot in this section. Therefore, erroneous determination may be prevented to a better extent by analyzing the light spots in this section, which may further improve the system accuracy and reduce the response time. On the contrary, if the autofocus system is not equipped with the defocus lens 400, and when the focus F of the objective lens 700 approaches the sample S, the light spots obtained by the image sensor (e.g., the light spots in the section less than −250 μm in FIG. 2) are severely deformed, which increases erroneous determinations by the system, which further reduces the system accuracy and increases the response time.

In this embodiment, as shown in FIG. 1, a distance D between the minimum light point MS of the focus light beam FL passing through the objective lens 700 and the focus F of the objective lens 700 may be controlled by a focal length of the defocus lens 400.

In this embodiment, the autofocus system 10 further includes drivers 20 and 20'. The drives 20 and 20' are, for instance, stages, which should however not be construed as a limitation in the disclosure. The driver 20 is connected to the objective lens 700, or the driver 20' is configured to hold the sample S, and electrically connected to the controller 30, wherein the controller 30 drives, through the drivers 20 and 20', the objective lens 700 or the sample S to move.

In this embodiment, the autofocus system 10 further includes a light shielding component 300. On the transmission path of the focus light beam FL, the light shielding component 300 is disposed between the objective lens 700 and the focus light source 100 and is configured to change a shape of a light spot formed by the focus light beam FL irradiating the sample S. For instance, the shape of the light spot formed by the focus light beam FL emitted from the focus light source 100 is substantially circular. After the focus light beam FL passes through the light shielding component 300, the shape of the light spot formed by the focus light beam FL passing through the light shielding component 300 may be substantially semicircular. However, the changes made by the light shielding component 300 to the shape of the light spot formed by the focus light beam FL should not be construed as limitations in the disclosure.

In this embodiment, the autofocus system 10 further includes lens groups 200 and 800 and beam splitters 500 and 600. The lens group 200 is disposed between the focus light source 100 and the light shielding component 300 and is configured to expand or reduce the diameter of the focus light beam FL or collimate the focus light beam FL. The defocus lens 400 is disposed between the beam splitter 500 and the light shielding component 300, and the beam splitter 500 is configured to allow a light beam having the same wavelength as that of the focus light beam FL to partially penetrate and to be partially reflected. The beam splitter 600 is disposed downstream of a light path of the beam splitter 500, and the objective lens 700 is disposed between the beam splitter 600 and the driver 20'. Similarly, the beam splitter 600 allows a light beam having the same wavelength as that of the focus light beam FL to be reflected or allows the light beam having the same wavelength as that of the focus light beam FL to partially penetrate and to be partially reflected. The lens group 800 is disposed between the beam splitter 500 and the first image sensor 900 and is configured to image the focus reflected light beam FRL on the first image sensor 900.

In this embodiment, the autofocus system 10 further includes a lens group 1000 and a second image sensor 1100 for receiving an image beam generated (through diffuse reflection) after an illumination light beam IL irradiate the sample S. The illumination light beam IL is, for instance, emitted by an imaging light source, and the beam splitter 600 is adapted to allow a light beam having the same wavelength as that of the illumination light beam IL to penetrate or allow the light beam having the same wavelength as that of the illumination light beam IL to partially penetrate and to be partially reflected. The imaging light source may be disposed around the sample S, e.g., on the driver 20'. Here, the lens group 1000 and the second image sensor 1100 in the autofocus system 10 are configured to image the sample S. After the controller 30 enables the focus F of the objective lens 700 to fall on the sample S, a minimum light point MS' of a parallel image beam IRL, after passing through the objective lens 700, is back traced from an image plane of the second image sensor 1100 and falls on the sample S.

Figure 3:
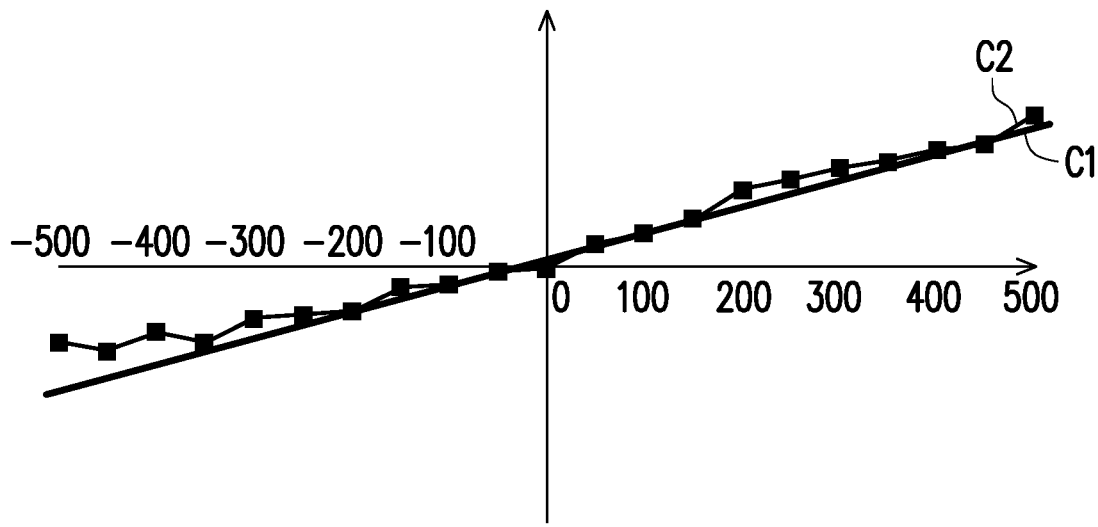
FIG. 3 illustrates correlations between experimental defocus values and theoretical values calculated at each defocus position of an objective lens of an autofocus system according to an embodiment of the disclosure.

FIG. 3 illustrates correlations between experimental defocus values and theoretical values calculated at each defocus position of an objective lens of an autofocus system according to an embodiment of the disclosure. Here, a straight line C1 represents theoretical values at different defocus positions of the objective lens 700 (i.e., the positions of the focus F of the objective lens 700 relative to the positions of the sample S), and a curve C2 represents experimental defocus values (corresponding to different defocus positions shown by the straight line C1) calculated by the controller 10. As shown in FIG. 3, the curve C2 is substantially close to the straight line C1, so the autofocus system 10 may achieve favorable accuracy.

Figure 4:
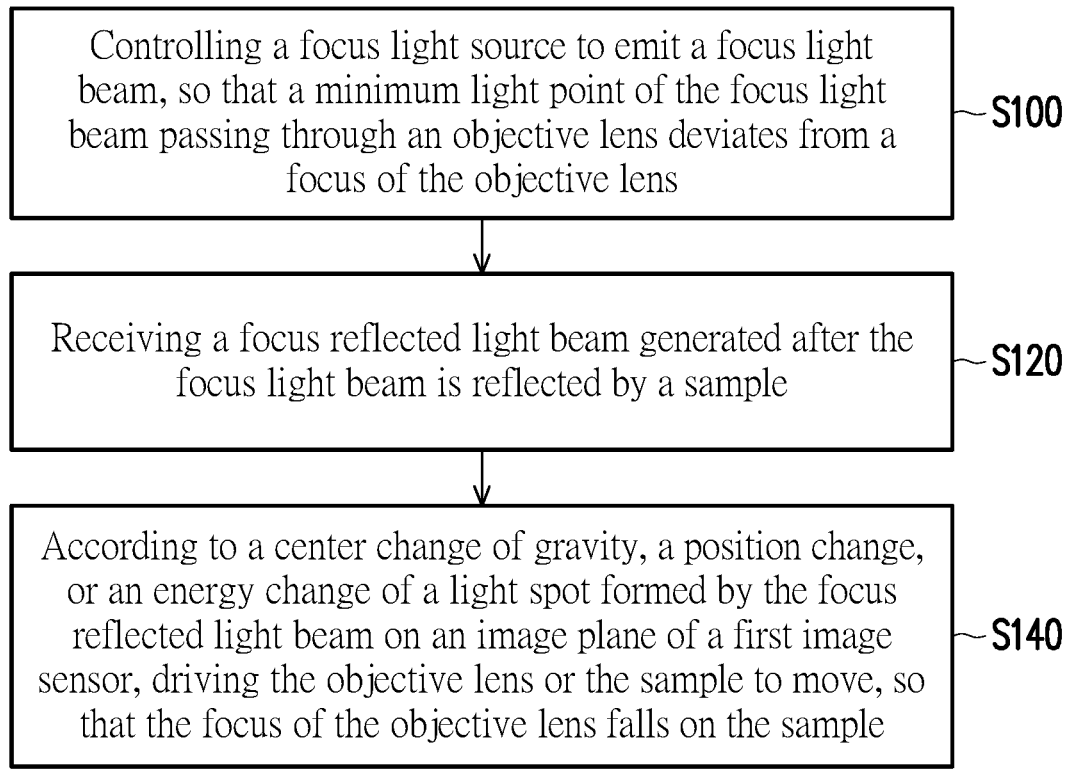
FIG. 4 is a flowchart of an autofocus method according to an embodiment of the disclosure.

FIG. 4 is a flowchart of an autofocus method according to an embodiment of the disclosure. With reference to FIG. 4, an autofocus method provided in an embodiment of the disclosure includes following steps. In step S100, the focus light source 100 is controlled to emit the focus light beam FL, so that the minimum light point MS of the focus light beam FL passing through of the objective lens 700 deviates from the focus F of the objective lens 700, wherein the focus light beam FL sequentially passes through defocus lens 400 and the objective lens 700 and then irradiates the sample S. In step S120, the focus reflected light beam FRL generated after the focus light beam FL is reflected by the sample S is received. In step S140, according to a center change of gravity, a position change, or an energy change of the light spots RS1 and RS2 formed by the focus reflected light beam FRL on the image plane IR of the first image sensor 900, the objective lens 700 or the sample S is driven to move, so that the focus F of the objective lens 700 falls on the sample S.

In this embodiment, the step of driving the objective lens 700 or the sample S to move includes following steps. The objective lens 700 or the sample S is driven to move by the drivers 20 and 20' electrically connected to the controller 30.

To sum up, in the autofocus system and the autofocus method provided in one or more embodiments of the disclosure, the defocus lens disposed on the transmission path of the focal light beam is applied, so that the minimum light spot of the focus light beam passing through the objective lens deviates from the focus of the objective lens. Hence, determination of the center change of gravity, the location change, or the energy change of the light spot based on a severely deformed light spot may be prevented by applying the autofocus system and the autofocus method provided in one or more embodiments of the disclosure. Thereby, erroneous calculations of the distance between the focus of the objective lens and the sample by the system may be prevented to a better extent, system accuracy may be further improved, and response time may be further reduced.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An autofocus system, comprising:
   a focus light source, configured to emit a focus light beam;
   an objective lens, disposed on a transmission path of the focus light beam, wherein the focus light beam irradiates a sample after passing through the objective lens;
   a defocus lens, disposed on the transmission path of the focus light beam, so that a minimum light point of the focus light beam passing through the objective lens deviates from a focus of the objective lens;
   a first image sensor, configured to receive a focus reflected light beam generated after the focus light beam is reflected by the sample; and
   a controller, electrically connected to the first image sensor,
   wherein the controller drives the objective lens or the sample to move according to a center change of gravity, a position change, or an energy change of a light spot formed by the focus reflected light beam on an image plane of the first image sensor, so that the focus of the objective lens falls on the sample,
   the autofocus system further comprising a second image sensor, configured to receive an image beam generated after an illumination light beam irradiates the sample, wherein after the controller enables the focus of the objective lens to fall on the sample, a minimum light point of a parallel image beam, after passing through the objective lens, is back traced from an image plane of the second image sensor and falls on the sample.

2. The autofocus system according to claim 1, wherein a distance between the minimum light point of the focus light beam passing through the objective lens and the focus of the objective lens is controlled by a focal length of the defocus lens.

3. The autofocus system according to claim 1, further comprising:
   a driver, connected to the objective lens or configured to hold the sample, and electrically connected to the controller, wherein the controller drives, through the driver, the objective lens or the sample to move.

4. The autofocus system according to claim 1, further comprising:
   a light shielding component, disposed between the objective lens and the focus light source on the transmission path of the focus light beam and configured to change a shape of a light spot formed by the focus light beam irradiating the sample.

5. An autofocus method comprising:
   controlling a focus light source to emit a focus light beam, so that a minimum light point of the focus light beam passing through an objective lens deviates from a focus of the objective lens, wherein the focus light beam sequentially passes through a defocus lens and the objective lens and then irradiates a sample;
   receiving a focus reflected light beam generated after the focus light beam is reflected by the sample;
   according to a center change of gravity, a position change, or an energy change of a light spot formed by the focus reflected light beam on an image plane of a first image sensor, driving the objective lens or the sample to move, so that the focus of the objective lens falls on the sample, wherein a second image sensor is configured to receive an image beam generated after an illumination light beam irradiates the sample, wherein after the controller enables the focus of the objective lens to fall on the sample, a minimum light point of a parallel image beam, after passing through the objective lens, is back traced from an image plane of the second image sensor and falls on the sample.

6. The autofocus method according to claim 5, wherein a distance between the minimum light point of the focus light beam passing through the objective lens and the focus of the objective lens is controlled by a focal length of the defocus lens.

7. The autofocus method according to claim 5, wherein the step of driving the objective lens or the sample to move comprises:

driving the objective lens or the sample to move by a driver electrically connected to a controller, wherein the driver is connected to the objective lens or configured to hold the sample.

8. The autofocus method according to claim 5, wherein a light shielding component is disposed between the objective lens and the focus light source on a transmission path of the focus light beam and configured to change a shape of a light spot formed by the focus light beam irradiating the sample.

\* \* \* \* \*